(12) United States Patent
Chung et al.

(10) Patent No.: US 12,057,275 B2
(45) Date of Patent: Aug. 6, 2024

(54) PACKAGING OF ROLL-TYPE SOLID ELECTROLYTIC CAPACITOR ELEMENTS

(71) Applicants: Yu-Peng Chung, New Taipei (CN); Chia-Wei Li, Taoyuan (TW); Wen Cheng Hsu, Taipei (TW); En-Ming Chen, New Taipei (TW); Che-Chih Tsao, Hsinchu (TW)

(72) Inventors: Yu-Peng Chung, New Taipei (CN); Chia-Wei Li, Taoyuan (TW); Wen Cheng Hsu, Taipei (TW); En-Ming Chen, New Taipei (TW); Che-Chih Tsao, Hsinchu (TW)

( * ) Notice: Subject to any disclaimer, the term of this patent is extended or adjusted under 35 U.S.C. 154(b) by 0 days.

(21) Appl. No.: 17/992,882

(22) Filed: Nov. 22, 2022

(65) Prior Publication Data
US 2024/0170225 A1  May 23, 2024

(51) Int. Cl.
| H01G 9/012 | (2006.01) |
| H01G 9/00 | (2006.01) |
| H01G 9/042 | (2006.01) |
| H01G 9/08 | (2006.01) |
| H01G 9/15 | (2006.01) |

(52) U.S. Cl.
CPC .......... *H01G 9/012* (2013.01); *H01G 9/0029* (2013.01); *H01G 9/0425* (2013.01); *H01G 9/08* (2013.01); *H01G 9/151* (2013.01)

(58) Field of Classification Search
None
See application file for complete search history.

(56) References Cited

U.S. PATENT DOCUMENTS

| 3,475,659 A * | 10/1969 | Cannon, Jr. | H01G 9/08 361/328 |
| 4,803,598 A * | 2/1989 | Efford | H01G 9/08 361/541 |
| 2014/0262459 A1* | 9/2014 | Chen | H01G 9/0029 29/25.03 |
| 2023/0253162 A1* | 8/2023 | Chung | H01G 9/08 361/540 |

FOREIGN PATENT DOCUMENTS

| JP | 2000269084 A * | 9/2000 | |
| JP | 2021158183 A * | 10/2021 | B23K 1/0016 |

* cited by examiner

Primary Examiner — Eric W Thomas

(57) ABSTRACT

This invention describes a packaging structure for roll-type (wound-type) aluminum conductive polymer capacitor element. Two protective substrates are applied to sandwich a roll-type capacitor element in between with an insulating material surrounding the capacitor element also in between the protective substrates. The protective substrates comprise electrically separated anodic conductive pad and cathodic conductive pad on their surfaces and through holes that pass through the conductive pads. The capacitor element is oriented with its axis perpendicular to the two substrates. The anodic and cathodic leads of the capacitor element pass through the through holes. An anodic external terminal is plated over the anodic conductive pad and a cathodic external terminal is plated over the cathodic conductive pad so that the anodic external terminal is electrically connected to the anodic lead and the cathodic external terminal is electrically connected to the cathodic lead.

10 Claims, 6 Drawing Sheets

(a)  (b)

(a)

(b)

PACKAGING OF ROLL-TYPE SOLID ELECTROLYTIC CAPACITOR ELEMENTS

CROSS REFERENCE TO RELATED APPLICATIONS

This application claims the benefit of provisional patent application Ser. No. 63/283,222, filed on Nov. 25, 2021, by the present inventors, which is incorporated by reference in its entirety.

BACKGROUND OF THE INVENTION

1. Field of the Invention

The present invention relates to packaging structures and methods of capacitor devices, especially of roll-type capacitor devices.

2. Background

Roll-type solid electrolytic capacitors packaged by existing approach have shortcomings in terms of device size and vibration resistance and therefore have limitations in certain application areas. FIG. 1 depicts several common forms of roll-type (wound) solid electrolytic capacitor element that can be made by existing commercial equipment from commercially available parts. Form 10F and form 10G are the most typical forms. A typical roll-type (wound) solid electrolytic capacitor element comprises a cylindrical capacitor element body 13, an anodic lead 11 and a cathodic lead 12. The capacitor element body is formed by rolling stripes of etched aluminum foils together with a spacer layer into a cylindrical roll. It was then filled with polymer-based solid electrolyte. The lead usually comprises a 3-section 3-material structure: a root section of aluminum tab or wire (11D, 12D) that is directly welded to the anodic or cathodic aluminum foils in the capacitor element body, an end section of copper clad steel core lead wire (11DC, 12DC) and a joining section (11W, 12W) where the aluminium tab is welded to the end section. For convenience, this is called standard lead. It is also possible to obtain capacitor elements with leads of aluminium wire only, as shown as 11D and 12D in form D and form E. Form 10F, and form 10D, has both leads on the same end of the body while form 10G, and form 10E, has the two leads on opposite ends. Existing packaging approach for roll-type solid electrolytic capacitors applies a can-shape aluminum casing to contain the body and seals the casing, at one end or both ends, with a sealing material, such as plastics or rubber, clamped by the aluminum casing. This packaging approach involves multiple discrete components that must be manufactured separately, requires several special machines and generally has to be performed piece by piece, that is, not by parallel processing. In many packaged capacitors, the sealing takes up a significant portion of the total device volume. Further, this can-type packaging leaves the capacitor element in the casing supported only from one end or two ends at the aluminium lead without any mechanical support to the capacitor element body. As a result, material fatigue at the aluminium leads under frequent vibrations creates reliability issues for applications in vehicle and transportation industries.

Solid electrolytic capacitor elements are fragile and therefore some common electronic packaging processes are difficult to apply. Conventional packaging process such as molding compound by transfer molding is associated with highly viscous material flow under large pressure. To make thin insulation, in order to reduce device size, the spacing between a mold wall and a capacitor element must be reduced, which increases viscous stress over the capacitor element if the same flow rate is to be maintained. Compression molding reduces pressurized flow but not eliminate it. Sheet compound molding involves high pressure. Accordingly, an improved packaging structure and method will be beneficial.

BRIEF SUMMARY OF THE INVENTION

This invention describes a packaging structure for roll-type (wound-type) aluminum conductive polymer capacitor elements. Two protective substrates are applied to sandwich a roll-type capacitor element in between with an insulating material surrounding the capacitor element also in between the protective substrates. The capacitor element is oriented with its axis of roll perpendicular to the two protective substrates. The anodic and cathodic leads of the capacitor element were cut short and pass through holes to reach the external sides of the protective substrates and are electrically connected to an anodic terminal and a cathodic terminal on the external surface(s) of the protective substrates. For the case of capacitor element with aluminium leads, the external terminals and the electric connections from the terminals to the aluminum electrode leads of the capacitor element is in general made by a multi-step plating process, which includes a zinc substitution step to make the aluminum leads to be able to receive plating. For the case of capacitor element with the standard leads, that is, leads of the typical 3-section 3-material structure with copper clad end sections, the electric connection between the leads and the external terminal is basically by soldering followed by electroplating. The aluminum tab part of the lead (the root section) is bent to rotate the joining section by about 90 degree. This allows the body of the capacitor element to be positioned close to the protective substrate or to the surface of the packaging, reducing overall device size. The copper clad part of the lead (the end section) is also bent to facilitate electric connection to an external terminal. The external terminals and the electric connections from the terminals to the copper clad end of the electrode leads of the capacitor element is in general made by soldering, finishing and copper plating.

The filling of the insulating material can be conducted by a capillary filling process or by a simple pouring and flooding process. In general, liquid insulating material of low to medium viscosity is used and flow speed is kept low so not to damage the capacitor elements. After filling, a curing process hardens the insulating material and bond the assembly into an integral piece.

DETAILED DESCRIPTION

Figure 1:
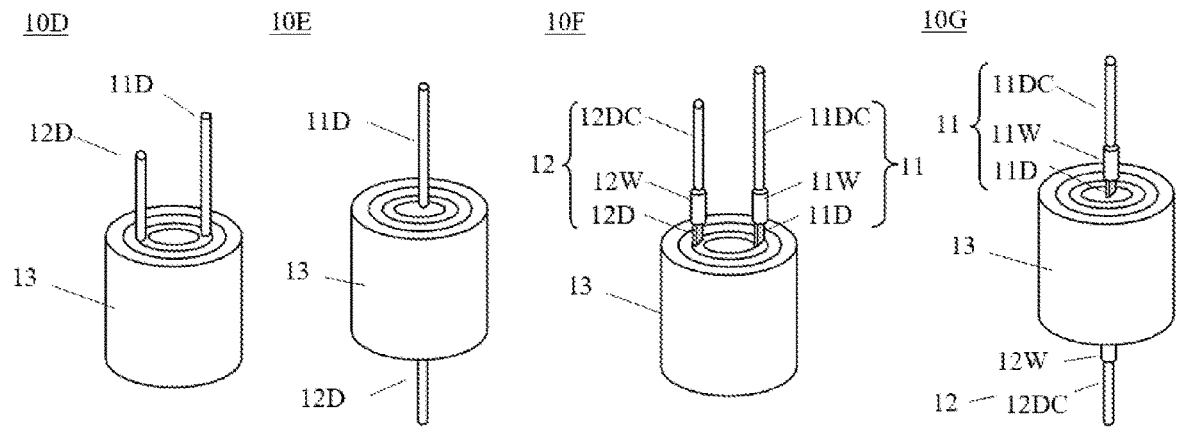
FIG. 1 depicts several common forms of roll-type solid electrolytic capacitor element that can be made by existing commercial equipment from commercially available parts.

Details of this invention are described with the following examples:

Example 1

Packaging a roll-type capacitor element with aluminum leads on the same end of the capacitor element body, based on protective substrates with conductive pads on surfaces of non-conductive bodies.

FIG. 2(a) depicts the packaging structure containing a roll-type capacitor element, which has its anodic and cathodic leads on the same end, in an exploded view, showing key components. The single capacitor element 10D is positioned in between an upper protective substrates 20U and a lower protective substrates 20L, with its axis perpendicular to the protective substrates. The electrode leads of the capacitor element were cut short in advance so that the remaining parts of the anodic lead 11D and cathodic lead 12D are of aluminum material. The upper protective substrate 20U comprises an electrically insulated substrate body 21 with conductive pads on its outer surfaces (22A, 22C). Two through-holes (28A and 28C) pass through the substrate and the conductive pads. When the components are assembled, the anodic lead 11D passes through hole 28A and the cathodic lead 12D passes through hole 28C, as depicted in FIG. 2(b) and FIG. 3, which is a cross-sectional view. Glue 52 is applied to attach the capacitor element to the upper protective substrate during assembly. The lower protective substrates 20L comprises an inner metal pad 22T, which acts as anti-moisture shield in the packaging.

The protective substrate can be made from a PCB (printed circuit board) copper clad board, which has an electrically insulated substrate body 21 of, usually, fiberglass reinforced epoxy with copper clad layers on one or both sides. The copper clad layer can be patterned into copper conductive pads by standard PCB processes. Plated through holes can also be processed by standard PCB processes.

FIG. 2(b) depicts the situation when the key components are assembled. The void 60S between the two protective substrates surrounding the capacitor element is filled with an insulating material 60, as shown in FIG. 2(c), which shows a perspective view of the packaged capacitor. The insulating material fills up into the through holes and envelops the whole capacitor element and the electrode leads, as depicted in FIG. 3, a cross-sectional view. The top surface where the two electrode leads protrude is first machined and then coated or plated with a conductive material to form the external terminals, as shown in FIG. 2(c), showing a perspective view of the packaged capacitor, with the external terminals 40A (anode) and 40C (cathode) at the top of an insulated body 42. The plated conductive material covers the outer conductive pads (22A, 22C). Thus, external anode terminal 40A and cathode terminal 40C are electrically connected to the anode 11D and cathode 12D of the capacitor element respectively.

The formation of the external terminals and their electrical connections to the conductive pads on the protective substrates are explained further next. After the filling and hardening of the insulating material 60 and before the plating of the external terminal 40A and 40C, the tips of electrode leads 11D and 12D, which protruded slightly above the conductive pads 22A and 22C, were machined so that the surfaces are planarized and the tip faces 11DA and 12DA of the electrode leads are exposed. Next, the tip surfaces, which are aluminum, are first deposited with a first conductive material. For example, by applying a zinc substitution process followed by an electroless nickel strike process, a layer of nickel can be deposited onto the tip surface. In this example, in general, the electroless nickel strike does not plate onto the exposed surface of the non-conductive substrate body 21 or the insulating material 60, nor onto the copper pads (22A, 22C), because copper is not catalytic to electroless nickel. Next, an electroless copper plating is applied, followed by electrolytic plating to build up thickness to form the external terminals 40A and 40C. Proper masks were used during the process to protect areas to be kept non-conductive. The zinc substitution process (or called zincate process or zinc-nickel process) is a plating process for plating over aluminum. Example descriptions of the process can be found in K. Murakami et al., "Effect of Zincate Treatment on Adhesion of Electroless Nickel-Phosphorus Coating for Commercial Pure Aluminum", *Materials Transactions*, Vol. 47, No. 10 (2006) pp. 2518-2523, or in S. Court, "Monitoring of zincate pre-treatment of aluminium prior to electroless nickel plating", Transactions of the Institute of Metal Finishing 95(2): 97-105, both are incorporated here by reference in its entirety.

Example 2

Packaging a roll-type capacitor element, with anodic and cathodic leads on the same end, together with an accompanying device.

For certain applications, it is convenient to include one or a few accompanying devices inside the same package with a roll-type capacitor element, that is, making the combination a circuit in one package.

For example, for a power system of a circuit board, a group of capacitors covering a wide range of capacitances are needed to stabilize power supply (voltage) at each power connection of each device, including bulk capacitors near power connections, ranging from a few micro F to hundreds of micro F, to local filtering and by-pass capacitors, generally from 0.01 to 0.1 micro F. In current practice, individual capacitors of different types and values are used and are assembled one by one to the circuit board. For quantity production of circuit board, it will be convenient to package a combination of multiple capacitors in one package, which reduces total footprint as well as assembly time. For example, near power connectors, aluminum solid electrolytic capacitors of several hundred micro F are frequently used with tantalum capacitors of a few to less than 100 micro F. And locally, smaller capacitors, film type or MLCC (multilayer ceramic capacitor), are used. Therefore, for tight layout, it is possible to combine these capacitors into one package. Because aluminum solid electrolytic capacitors are the largest, it is reasonable to package a roll-type aluminum solid electrolytic capacitor element together with one or more smaller capacitors.

Figure 4:
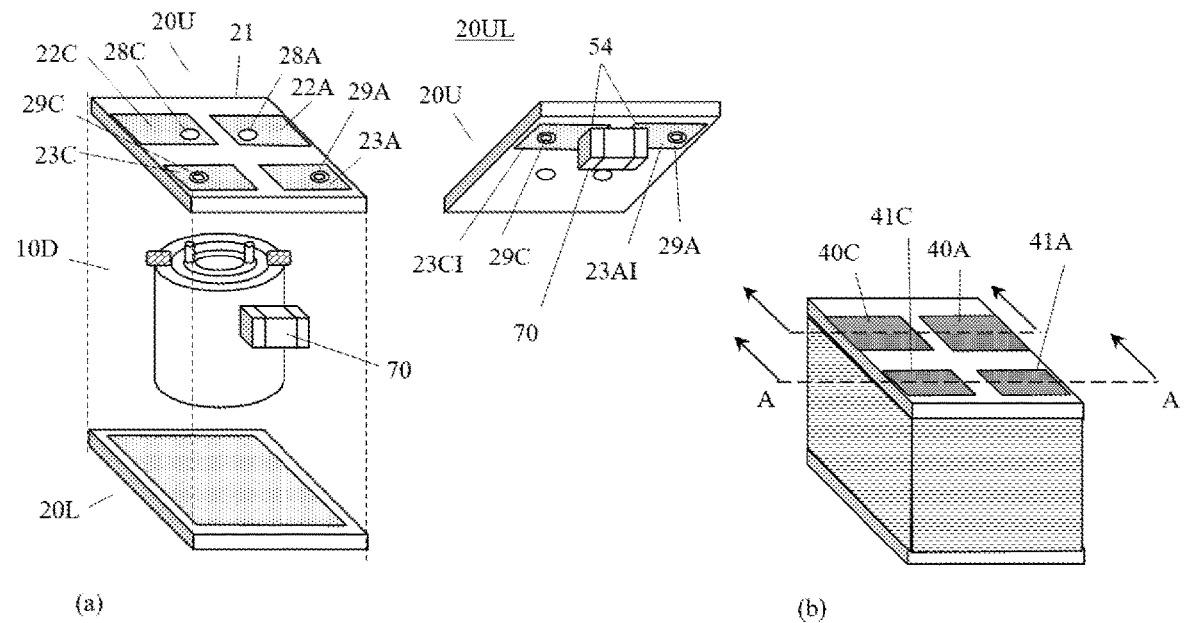
FIGS. 4 (a) and (b) depict an example packaging structure containing a roll-type solid electrolytic capacitor element and a small capacitor by the present invention.
Figure 5:
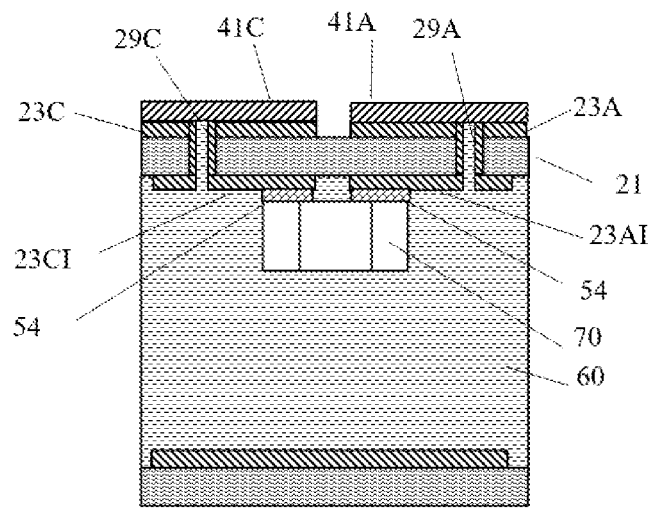
FIG. 5 depicts a cross-sectional view of the packaging structure of FIG. 4.

FIG. 4(*a*) illustrates an example packaging structure containing a roll-type solid electrolytic capacitor element 10D and a small capacitor 70 in an exploded view. The packaging and connecting method and components for the roll-type solid electrolytic capacitor are basically the same as those of the case of FIG. 2(*a*). However, the upper substrate further includes a second set of outer conductive pads (23C, 23A) and inner conductive pads (23CI, 23AI). 20UL depicts the upper substrate from a lower view angle to show the inner side. The inner conductive pads and the outer conductive pads are electrically connected through vias 29C and 29A, that is, plated through holes. The small capacitor is connected to the second set of conductive pads at the inner side by either soldering or conductive paste 54. The vias and the connection of the small capacitor can be processed in advance in separate processes. The components are then assembled and an insulating material is filled to envelop both capacitors, as shown in FIG. 4(*b*). FIG. 5 illustrates the cross-sectional view of the cut plane A-A indicated in FIG. 4(*b*) to show the connection of the small capacitor. Thus, the package contains two independent capacitors with separate external terminals (40C, 40A and 41C, 41A), which are plated over the corresponding conductive pads (22C, 22A and 23C, 23A). In application, the two capacitor can be used as two independent devices and the external terminals can be connected to power/ground planes/nodes of a circuit board according to need.

Example 3

Packaging a roll-type capacitor element with anodic and cathodic leads on opposite ends of the body 10E.

Figure 2:
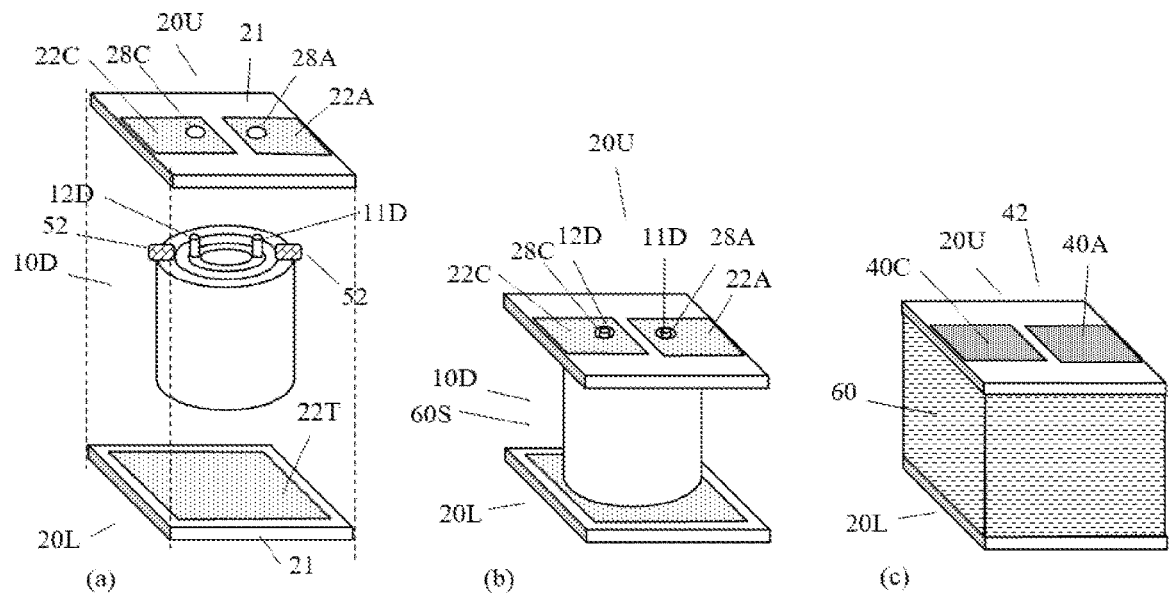
FIGS. 2 (a), (b) and (c) depict the structure and the procedure of packaging a roll-type solid electrolytic capacitor element with aluminium leads on the same end of the capacitor element body by the present invention.
Figure 3:
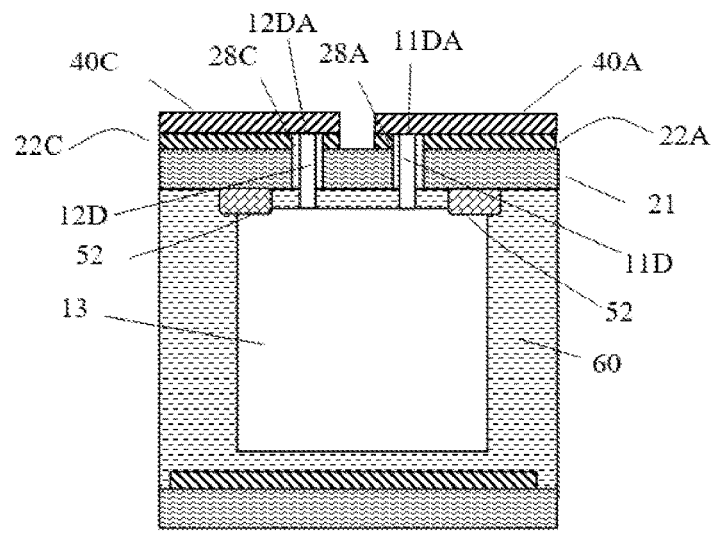
FIG. 3 depicts the cross-sectional view of the packaging structure of FIG. 2.
Figure 6:
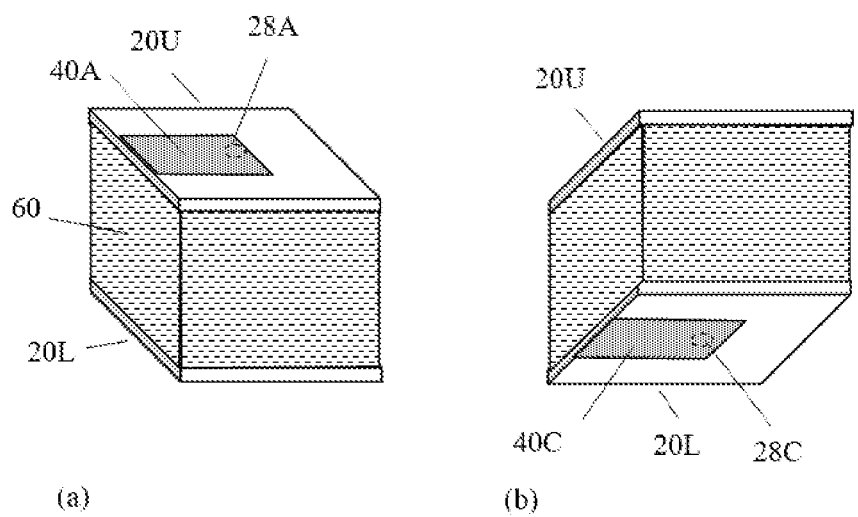
FIGS. 6 (a) and (b) depict the packaging of a roll-type solid electrolytic capacitor element with aluminium leads on opposite ends of the capacitor element body by the present invention.

The packaging structure and process will be basically similar to FIG. 2 except that the through hole 28A, the anodic conductive pad 22A and terminal 40A will be on the upper substrate 20U, for example, and the through hole 29A and the cathodic conductive pad 22C and terminal 40C will be on the lower substrate 20L. FIG. 6 illustrates a packaged capacitor in this case. FIG. 6(*a*) shows the anode side of the package while FIG. 6(*b*) shows that cathode side. 28A and 28C indicate the locations of the lead to terminal connection.

Example 4

Batch manufacturing by parallel processing

Figure 7:
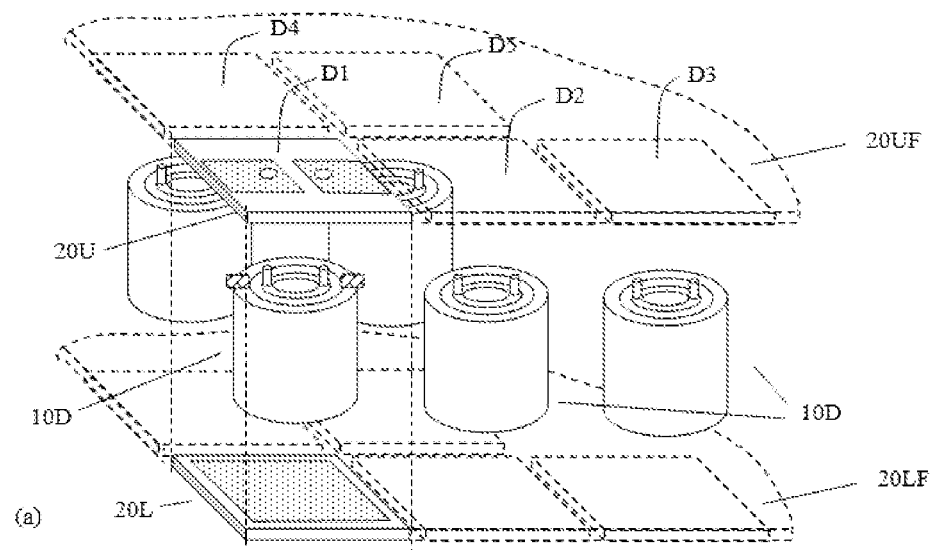
FIGS. 7 (a) and (b) depict batch manufacturing of multiple capacitor devices by the present invention.
Figure 7:
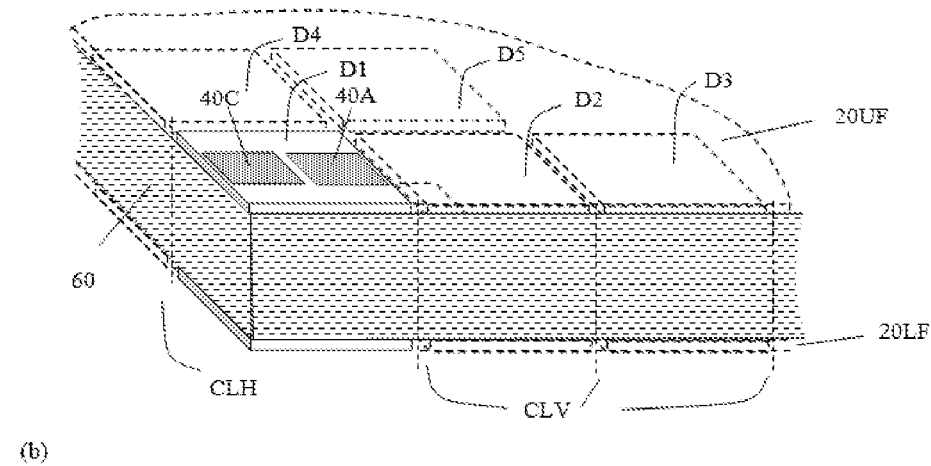

One advantage of this new packaging structure and process is that a large amount of capacitor elements can be processed and packaged in batch at the same time by parallel processing. Although the drawings in FIG. 2 to FIG. 5 illustrate the construction of a single device package, the construction can be extended into a 2D matrix. FIGS. 7(*a*) and 7(*b*) depict the idea. The protective substrates can start as two large full-size substrates (20UF, 20LF) with conductive pads and holes all pre-processed corresponding to locations of multiple devices (D1-D5). Multiple capacitor elements can then be placed (glued) to these locations and assembled to the substrates.

The insulating material 60 can be filled in between the two full-size substrates as a whole. The filling of the insulating material can be conducted by a capillary filling process or by a simple pouring and flooding process. In general, insulating material of low to medium viscosity is used and flow speed is kept low so not to damage the capacitor elements. After filling, a curing process harden insulating material and bond the assembly into an integral piece. The curing/hardening process inevitably introduces uneven expansion and contraction between the insulating material and the protective substrates. By having two protective substrates sandwiching the insulating material, bending deformation of the assembly after hardening can be minimized.

The plating of the external terminals (e.g. 40A, 40C) of all devices can also be performed simultaneously. Finally, sawing long cutting lines CLH and CLV separate individual devices.

Example 5

Figure 8:
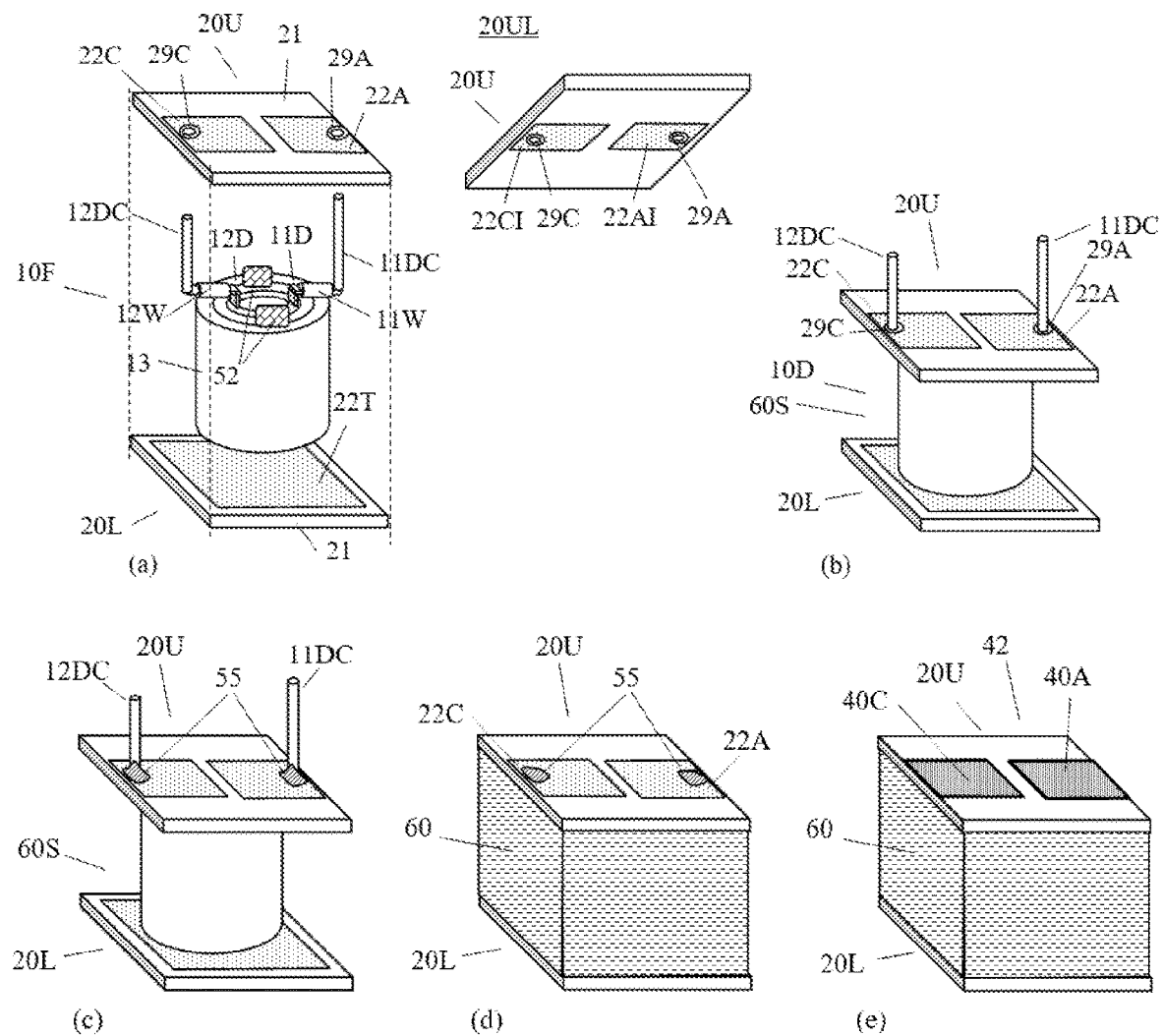
FIG. 8 (a), (b), (c), (d) and (e) depict the structure and the procedure of packaging a roll-type solid electrolytic capacitor element with standard leads on the same end of the capacitor body by the present invention.

Packaging a roll-type solid electrolytic capacitor element with standard leads on the same end of the capacitor element body 10F, based on protective substrates with conductive pads on surfaces of non-conductive bodies The standard leads have copper clad over their extended parts, which ease connection to external terminal because soldering can be applied and zinc substitution is not needed. FIG. 8 illustrates the structure and procedure of the packaging. FIGS. 8(*a*) and 8(*b*) show the assembly procedure of key components, which is similar to FIGS. 2 (*a*) and 2(*b*) except that the leads of the capacitor element are bent or folded. The aluminum tab part of the lead (11D, 12D) (root section) is bent to rotate the joining section (11W, 12W) by 90 degree. This allows the body of the capacitor element to be positioned close to the protective substrate when assembled, reducing overall device size. The copper clad part of the lead (11DC, 12DC) (end section) is also bent so that it points toward a corresponding hole in the upper protective substrate 20U. The folding of leads can be performed by applying a forming die in a separate process before assembling with the protective substrates.

The protective substrate can be made from a PCB (printed circuit board) copper clad board. In FIG. 8(*b*), the capacitor element is glued to the bottom of the upper substrate 20U with the leads passing through two vias, or plated through-holes, (29A, 29C). The plated through-holes electrically connect the outer conductive pads (22A, 22C) and the inner conductive pads (22AI, 22CI) of the anode and the cathode respectively. In other words, areas inside the holes, outside the top of the holes and outside the bottom of the holes as well as the lead wires passing through the holes are all copper. Thus, a point soldering machine can be applied to solder the leads to the pads from the upper side of the upper substrate. With proper use of soldering flux, solder 55 can flow into the plated through-holes and bond the lead to the through-holes and the pads, as shown in FIG. 8(*c*).

Figure 9:
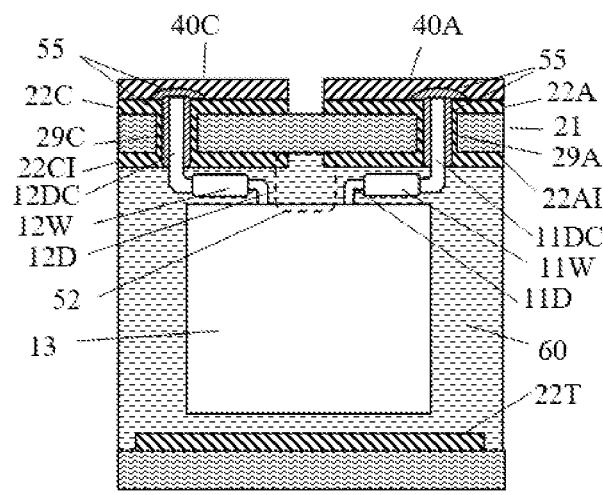
FIG. 9 depicts a cross-sectional view of the packaging structure of FIG. 8.
Figure 10:
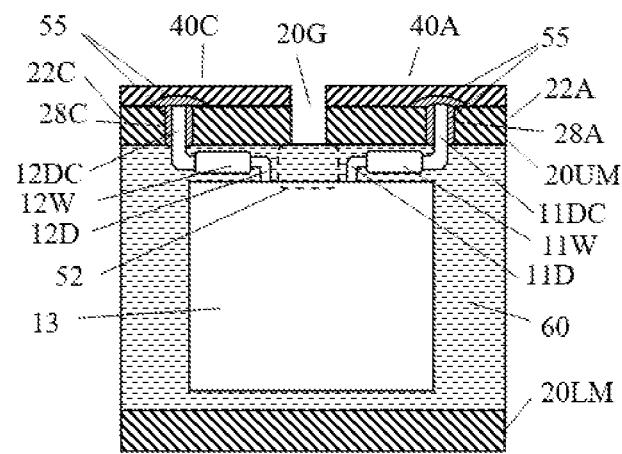
FIG. 10 depicts a cross-sectional view of the packaging structure based on all-conductor protective substrates by the present invention.

Insulating material 60 can then be filled and cured so that the assembly is hardened as an integral solid. The protruding leads can then be cut and the residues be polished. FIG. 8(*d*) shows the idea. Then a new layer of copper can be electroplated over the copper pads (22A, 22C) and the remaining solder material 55 on the pads to become the external terminals (40A, 40C), as shown in FIG. 8(*e*). FIG. 9 illustrates the cross-sectional view of the completed structure.

It is preferred that the solder used should be a high-temperature solder so that it will not melt when the external terminals of the packaged capacitor go through a reflow soldering process.

Example 6

Packaging a roll-type solid electrolytic capacitor element with standard leads on the same end of the capacitor element body 10F, based on all-conductor protective substrates The protective substrates can also be in the form of conductive substrates and pads only, that is, without an insulating substrate body. For example, this all-conductor substrate can be made of thin copper sheets. This packaging can further reduce overall device thickness. Take the construction of a PCB as example. A typical PCB may have a non-conductive core, of glass fiber reinforced epoxy, of thickness 4 to 8 mil (or 0.1 to 0.2 mm) covered with copper clad of 1 oz or even ½ oz, which corresponds to a thickness of 1.4 to 0.7 mil (or 0.035 to 0.018 mm), on each side. By using PCB as the protective substrates, the total thickness of 2 substrates is around 0.27-0.54 mm. On the other hand, if using 0.1 mm copper foil, the total thickness of 2 substrates can be reduced to 0.2 mm. If using copper clad sheets only, the total thickness of 2 sheets can be further reduced to 0.035-0.07 mm.

FIG. 9 illustrates a cross-sectional view of a packaging structure based on all-conductor protective substrates. This structure is basically similar to that of FIG. 8 except that an upper metal (copper) substrate 20UM and a lower copper substrate 20LM replace the PCB copper clad board. The through holes (28A, 28C) can be direct through holes. The procedure of packaging is also similar to that of FIG. 8, except that the copper pads 22A and 22C need to be made after the completion of lead soldering and insulating material curing by an etching process to open a gap 20G to separate the two electrodes.

Example 7

Packaging a roll-type capacitor element with standard leads on opposite ends of the body 10G.

This example is similar to example 5 or example 6 except that the anodic lead and the cathodic lead are connected to external terminals on the upper and the lower substrates respectively, at opposite ends of the packaged device. The resulted device looks similar to the one depicted in FIG. 6.

The present invention disclosed herein has been described by means of specific embodiments and process steps. However, numerous modifications, variations and enhancements can be made thereto by those skilled in the art without departing from the spirit and scope of the disclosure set forth in the claims.

What is claimed is:

1. A packaging structure for roll-type solid electrolytic capacitor comprising:
   two protective substrates including an upper substrate disposed over a lower substrate, the substrates comprising electrically separated anodic conductive pad and cathodic conductive pad on predetermined positions on surfaces, the protective substrates comprising through holes that pass through the conductive pads;
   a roll-type solid electrolytic capacitor element disposed in between the upper substrate and the lower substrate with its roll axis perpendicular to the protective substrates, the capacitor element comprising an anodic lead and a cathodic lead, the anodic lead passing through the through hole on the anodic conductive pad and the cathodic lead passing through the through hole on the cathodic pad;
   an insulating material filling the space in between the substrates and encompassing the capacitor element such that the protective substrates and the capacitor elements and the insulating material form an integral solid body;
   an anodic external terminal plated over the anodic conductive pad and a cathodic external terminal plated over the cathodic conductive pad, the anodic external terminal being electrically connected to the anodic lead and the cathodic external terminal being electrically connected to the cathodic lead.

2. The packaging structure of claim 1, wherein the external terminals being plated copper, the anodic lead and the cathodic lead being aluminum leads, the leads being electrically connected to the corresponding external terminals by an inner nickel layer.

3. The packaging structure of claim 1, wherein the anodic lead and the cathodic lead being standard leads with copper clad end sections, the through holes being copper plated through holes, the copper clad end sections of the leads being electrically connected to the corresponding conductive pads by a solder material, the external terminal being copper plated over the conductive pads and the solder material.

4. The packaging structure of claim 3, wherein the anodic lead and the cathodic lead being folded to reduce distance between the capacitor element and the protective substrates.

5. The packaging structure of claim 1, wherein the protective substrates being all-conductor substrates comprising thin copper sheets, the conductive pads being parts of the thin copper sheets electrically separated by selective etching.

6. The packaging structure of claim 1, further comprising at least an one accompanying device in the same package.

7. The packaging structure of claim 6, the at least one accompanying device being another capacitor for the purpose of voltage stabilization applications.

8. A method for quantity production of packaging structures of roll-type solid electrolytic capacitor including:
   (a) providing a first substrate as an upper substrate, which includes on its surface multiple electrically conductive pads and multiple through holes at pre-determined positions;
   (b) disposing multiple roll-type solid electrolytic capacitor elements to lower surface of the upper substrate with electrode leads of the capacitor elements passing through the through holes;
   (c) providing a second substrate as a lower substrate to sandwich the capacitor elements between the lower substrate and the upper substrate and filling the space between the two substrates with a liquid insulating material and then hardening the insulating material so that the upper substrate and the lower substrate and the capacitor elements join into an integral piece;
   (d) plating copper over the conductive pads to form external terminals and connecting the external terminals to the electrode leads of the capacitor elements;
   (e) cutting the integral piece and separating it into multiple individual packaging structures of roll-type solid electrolytic capacitors.

9. The method of claim 8, the connecting of the external terminals to the electrode leads applying aluminum wires as the electrode leads and a nickel layer is plated over tips of the aluminum wires by a zinc substitution process before the plating of copper external terminals.

10. The method of claim 8, the connecting of the external terminals to the electrode leads including:
   plating the through holes with copper so that they become copper plated through holes;
   applying wires with copper clad end sections as the electrode leads;

soldering the copper clad end sections of the electrode leads to the conductive pads and the copper plated through holes.

\* \* \* \* \*